US012314803B2

(12) United States Patent
Desouky et al.

(10) Patent No.: US 12,314,803 B2
(45) Date of Patent: May 27, 2025

(54) METHOD AND APPARATUS FOR PHYSICALLY SECURE BACKSCATTER COMMUNICATIONS

(71) Applicant: QATAR UNIVERSITY, Doha (QA)

(72) Inventors: Gehad Desouky, Doha (QA); Tamer Khattab, Doha (QA); Khalid Abualsaud, Doha (QA); Mohsin Guizani, Doha (QA); Elias Yaacoub, Doha (QA); Heba Shehata, New South Wales (AU)

(73) Assignee: QATAR UNIVERSITY, Doha (QA)

( * ) Notice: Subject to any disclaimer, the term of this patent is extended or adjusted under 35 U.S.C. 154(b) by 146 days.

(21) Appl. No.: 17/673,609

(22) Filed: Feb. 16, 2022

(65) Prior Publication Data
US 2022/0261565 A1    Aug. 18, 2022

Related U.S. Application Data

(60) Provisional application No. 63/149,789, filed on Feb. 16, 2021.

(51) Int. Cl.
*G06K 7/10* (2006.01)
*G06K 19/07* (2006.01)
(52) U.S. Cl.
CPC ..... *G06K 7/10366* (2013.01); *G06K 19/0723* (2013.01)

(58) Field of Classification Search
CPC ............ G06K 7/10366; G06K 19/0723
(Continued)

(56) References Cited

U.S. PATENT DOCUMENTS

2005/0212660 A1\*  9/2005  Hansen .............. H04K 3/43
340/10.2

OTHER PUBLICATIONS

Baihaqi Siregar et al., "RFID Wristband for Motorbikes Real-Time Security System", 2019 The 3rd International Conference on Electrical, Telecommunication and Computer Engineering (ELTICOM), 4 pages.
(Continued)

*Primary Examiner* — Daniel A Hess
(74) *Attorney, Agent, or Firm* — SQUIRE PATTON BOGGS (US) LLP

(57) ABSTRACT

Systems, methods, apparatuses, and computer program products for backscatter RFID communication security. In some example embodiments, a system may include a RFID reader, and a passive RFID tag. A desired direction channel $H_{\theta_R}$ between the RFID reader and the passive RFID tag is $H_{\theta_R} = [e^{j2\pi \cos \theta_R} \; e^{j\pi \cos \theta_R} \; e^{j0} \; e^{-j\pi \cos \theta_R} \; e^{-j2\pi \cos \theta_R}]$. In certain example embodiments, a system includes a first RFID reader, a second RFID reader, and a passive RFID tag. The first RFID reader is aware of the location of the second RFID reader and the location of the passive RFID tag. The second RFID reader is aware of the location of the first RFID reader and the location of the passive RFID tag. The first RFID reader and the second RFID reader are aware of each others generated reader signals.

3 Claims, 17 Drawing Sheets

(58) Field of Classification Search
USPC .......................................................... 235/451
See application file for complete search history.

(56) References Cited

OTHER PUBLICATIONS

Qian Yang et al., "Physical Layer Security in MIMO Backscatter Wireless Systems", IEEE Transactions on Wireless Communications, vol. 15, No. 11, Nov. 2016, 14 pages, DOI: 10.1109/TWC.2016.2604800.

W. Saad et al., "On the Physical Layer Security of Backscatter RFID Systems", Electrical and Computer Engineering Department, University of Miami, Coral Gables, FL, Electrical and Computer Engineering Department, University of Houston, TX, Electrical Engineering Department, Princeton University, NJ, 5 pages.

S. Park, "An IoT Application Service Using Mobile RFID Technology", Media R&D Center, SK Telecom, 4 pages.

Gehad Desouky et al., "Directional Modulation for Secure RFID in Health Systems", Qatar Univeristy, 6 pages.

\* cited by examiner

METHOD AND APPARATUS FOR PHYSICALLY SECURE BACKSCATTER COMMUNICATIONS

CROSS-REFERENCE TO RELATED APPLICATION

This application claims the benefit of U.S. Provisional Application No. 63/149,789, filed Feb. 16, 2021. The entire content of the above-referenced application is hereby incorporated by reference.

TECHNICAL FIELD

Some example embodiments may generally relate to radio-frequency identification (RFID). For example, certain example embodiments may relate to systems and/or methods for backscatter RFID communication security.

BACKGROUND

RFID may be used in applications including object and human tracking, inventory, supply chain, library cards, access control, internet of things (IoT) devices, medical devices, contactless cards, e-Passports, and drug tracking. However, in current backscatter systems, eavesdroppers located near an RF tag can more easily breach security compared with distant eavesdroppers. Furthermore, higher layer security protocols may require more power consumptions and increased reader/tag complexity, leading to increased cost of deployment.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for using dynamic directional modulation technology to secure the communication links between an RF reader and an RF tag is not intended to limit the scope of certain example embodiments, but is instead representative of selected example embodiments.

Certain example embodiments described herein may have various benefits and/or advantages to overcome the disadvantages described above. For example, certain example embodiments may maintain the power consumption limitations from the reader's side, and maintain the reduced complexity and reduced cost of RFID tags. Furthermore, the performance of the eavesdropper with breaching system security does not improve with higher signal-to-noise ratios (SNR values) (i.e., closer distances). Thus, certain example embodiments discussed below are directed to improvements in computer-related technology.

Some example embodiments described herein may provide a secure RFID system (or any backscatter communication-based system) without sacrificing the simplicity of the RFID tag component. In particular, dynamic directional modulation (DM) technology may secure the communication links between the reader and the tag. Such DM technology may be exploited by a reader equipped with multiple antennas to transmit a readable signal only in the direction of a legitimate tag, while a scrambled signal is sent in other directions.

Figure 1:
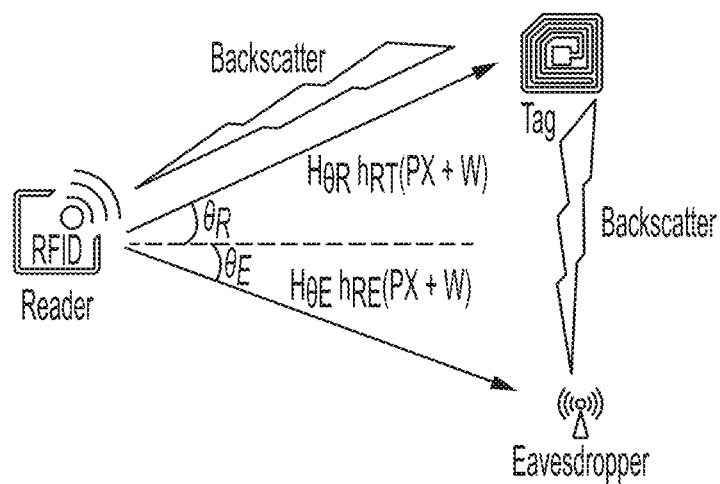
FIG. 1 illustrates an example of communication links between a reader, a tag, and an eavesdropper according to certain example embodiments.

FIG. 1 illustrates an example of a reader 101 transmitting a signal to a tag 102 at the desired direction, and sending a signal to a eavesdropper 103 at the distorted direction. For example, the desired direction channel between the reader 101 and the tag 102 may be calculated according to $H_{\Theta_R}=[e^{j2\pi \cos\Theta_R} e^{j\pi \cos\Theta_R} e^{j0} e^{-j\pi \cos\Theta_R} e^{-j2\pi \cos\Theta_R}]$ (Equation 1).

Figure 2:
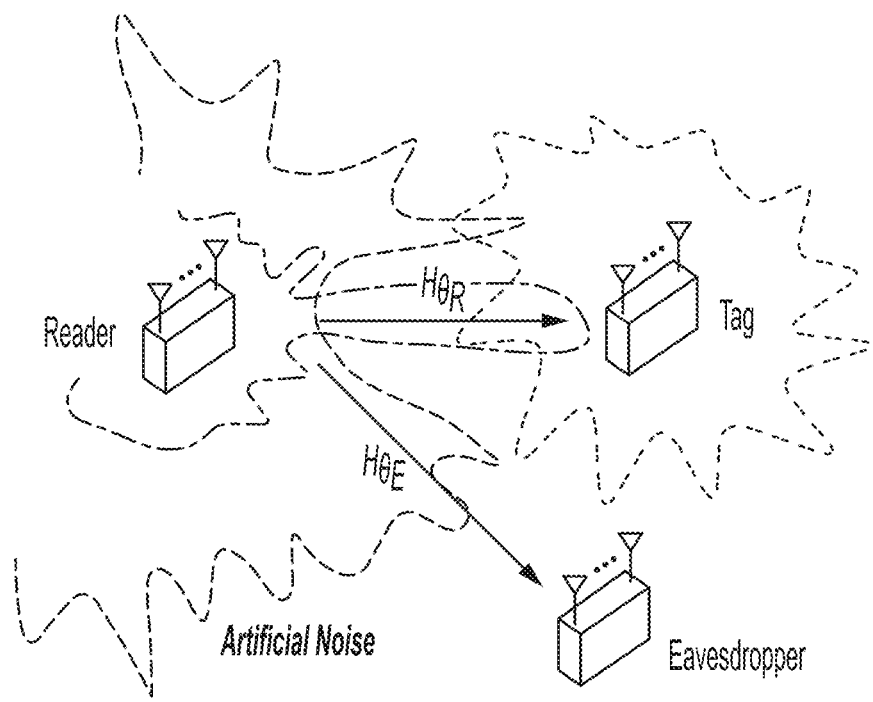
FIG. 2 illustrates an example of secure directional modulation modelled as beamforming with orthogonal noise injection according to some example embodiments.

This DM used synthesis approach utilizes artificial orthogonal noise injection, where a noise vector may be created to be null in the direction of the tag 102, as shown in FIG. 2, while the signal from reader 101 may be beamformed to be focused on the direction of the tag 102.

The overall DM system may be defined according to E=PX+W (Equation 2), where E is the excitation signal transmitted from the antennas of reader 101, P is the beamforming vector fed into the tuneable phase shifters of the antennas of reader 101, X is the signal of reader 101, and W is the artificial injected noise designed to be null to the desired channel direction.

In order to secure this system, the signal of reader 101 must be unknown to eavesdropper 103, which may be accomplished by using a pseudorandom uniform distribution generator for the signal of reader 101, such as $$X \sim U\left(-\frac{a}{2}, \frac{a}{2}\right). \quad \text{(Equation 3)}$$

Figure 3:
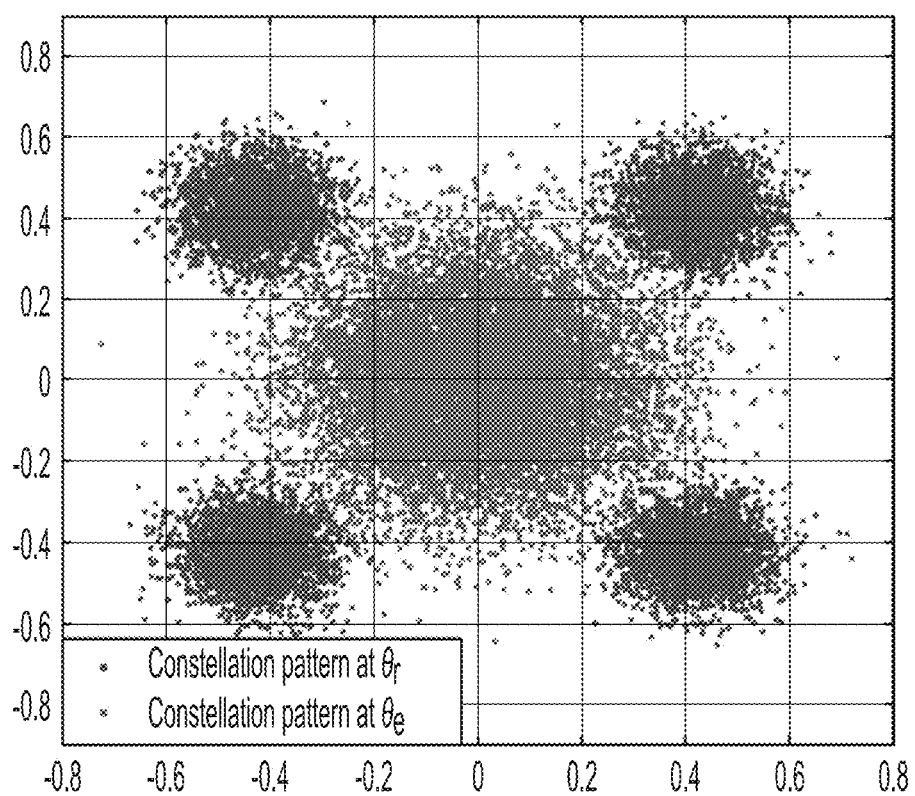
FIG. 3 illustrates a constellation pattern at a desired tag direction and at an eavesdropper direction according to various example embodiments.

FIG. 3 illustrates the constellation of the received signal by the tag and the eavesdropper, where the tag receives a correct signal constellation (outside scatter concentrations) and the eavesdropper receives a scrambled constellation (central scatter concentration).

Figure 4:
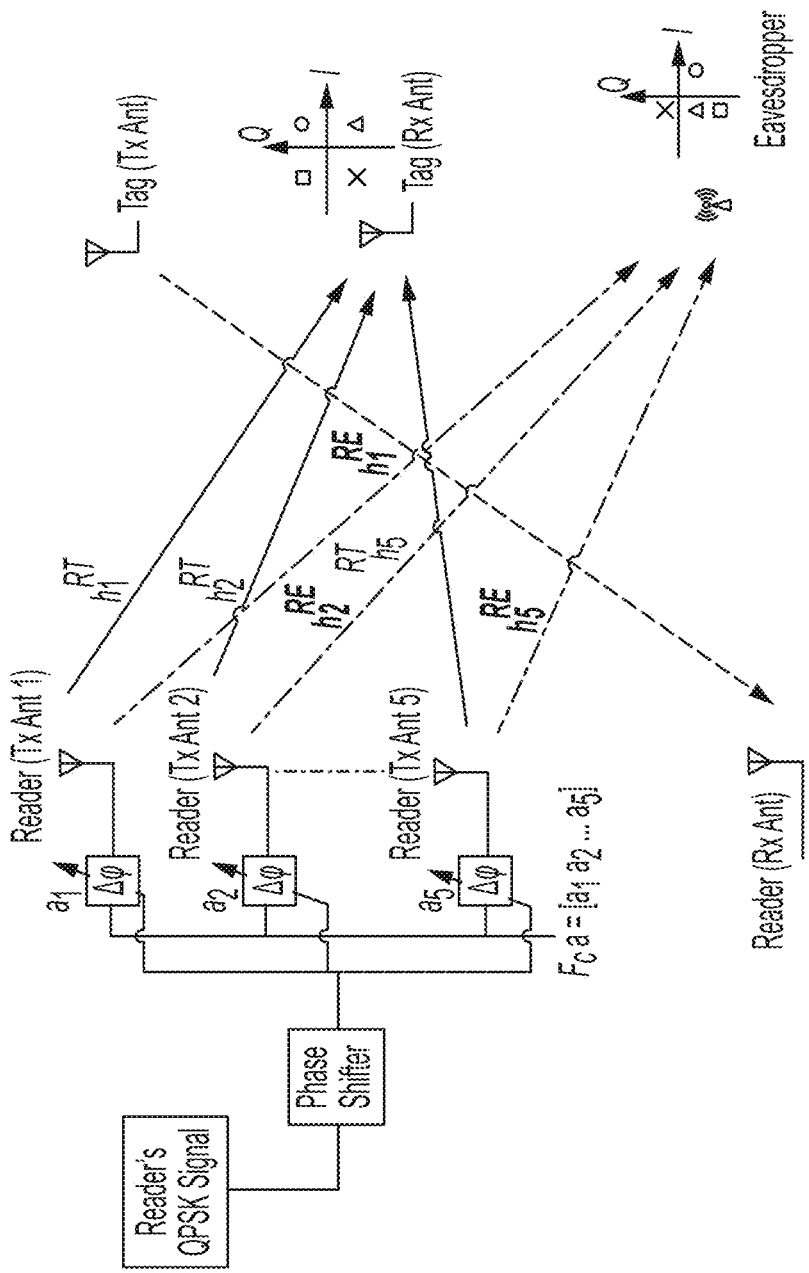
FIG. 4 illustrates a system block diagram for secure radio frequency identification using directional modulation according to certain example embodiments.

FIG. 4 illustrates a system block diagram for secure RFID using DM, where multiple antennas are implemented at the reader side, and the tag and eavesdropper are assumed to be passive devices with a single antenna receiver. The tag may perform omnidirectional backscatter communication by simply modulating the received reader signal using its information signal, s, such that the signal reflected from the tag may be $E_{tag}=s[H_{\theta_R}(PX+W)+n_t]$ (Equation 4), where $n_t$ is the tag's receiver noise.

The beamforming vector may be designed to point in the direction of $\Theta_R$, i.e., $$P = \frac{H^*_{\theta_R}}{\|H_{\theta_R}\|}, \quad \text{(Equation 5)}$$

and the artificial noise may be null in the direction of $\Theta_R$, i.e., $H_{\theta_R}W=0$ (Equation 6). As a result, the signal backscattered from the tag in all directions may be $E_{tag}=\|H_{\theta_R}\|X_s+n_ts$ (Equation 7).

It is noted that, despite that both the reader and the eavesdropper receiving approximately the same scattered signal from the tag defined by Equation (7), both of the reader and the eavesdropper need to know how to extract the tag information, s, which is derivable from term $\|H_{\Theta R}\|Xs$ if the receiver (i.e., reader or eavesdropper) know X. Furthermore, Equation 7 (above) multiplies s by noise, resulting in a noise term. Since X is a signal generated by a reader, the reader can derive s from the aforementioned term. If a conventional (nonsecure) RFID method were used, the reader may inadvertently transmit X to the eavesdropper when transmitting to the tag, enabling the eavesdropper to use X to deduce s. By using the techniques described herein, using the DM at the time of sending X from the reader to the tag prevents the eavesdropper from receiving X, and thereby deducing s, allowing for secure communication of tag information.

The effectiveness of the techniques described herein can be demonstrated using bit error rate (BER) criteria (probability of bit error at the receivers). For a secure link, the BER at the reader would preferably be a very low value<<0.5, and the BER at the eavesdropper would preferably be approximately 0.5. Communication links can be used between the reader, tag, and eavesdropper that have a fading effect and follow a random model, e.g., Rayleigh distribution, and the direction of the tag with respect to the reader (desired direction) is $\Theta_R=80°$.

Figure 5:
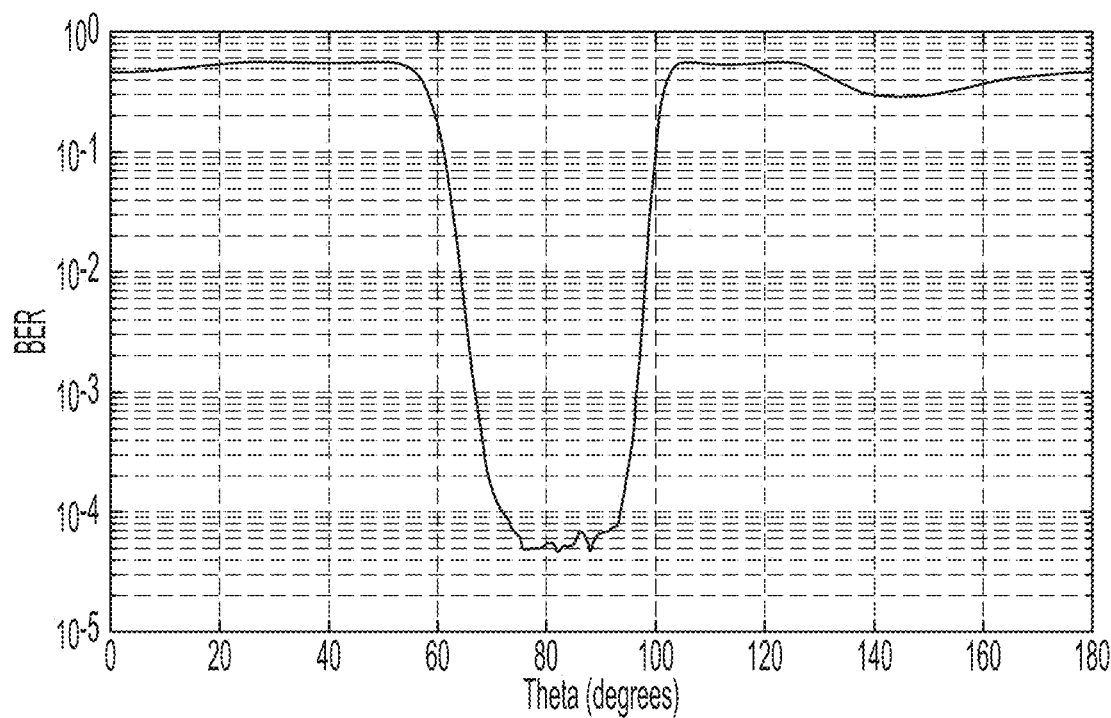
FIG. 5 illustrates bit error rate vs. $\Theta$ for signal-to-noise ratio=15 dB, where the tag is at $\Theta_R=80°$, according to some example embodiments.

FIG. 5 illustrates the performance of some example embodiments by plotting the BER against $\Theta$. FIG. 5 shows that the BER is at its lowest value at the desired direction, and that the other directions (possible eavesdropper locations away from the tag direction) provide some security (BER≈0.5).

Figure 6:
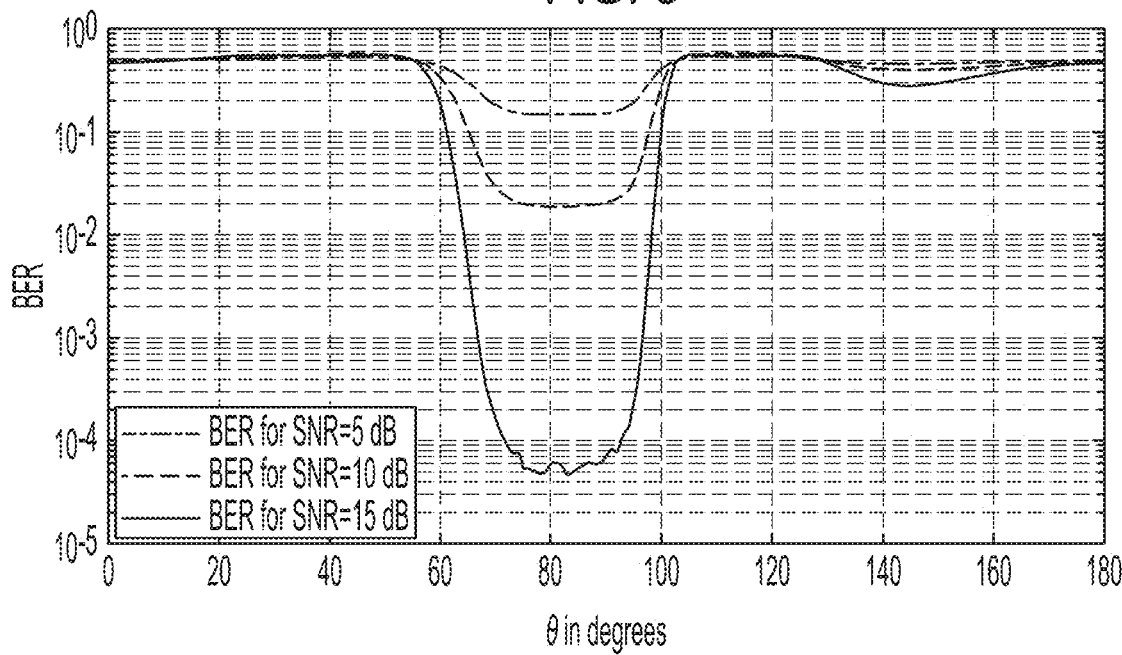
FIG. 6 illustrates bit error rate vs. $\Theta$ for different signal-to-noise ratio values according to various example embodiments.

FIG. 6 illustrates the BER versus the spatial direction of the eavesdropper at different SNR values. FIG. 6 depicts that increasing the SNR may enhance the performance of the reader (BER around $\Theta=80°$); however, the performance of the eavesdropper (secrecy) remains as BER≈0.5, which shows the robustness of the secrecy performance of some example embodiments to SNR value.

Figure 7:
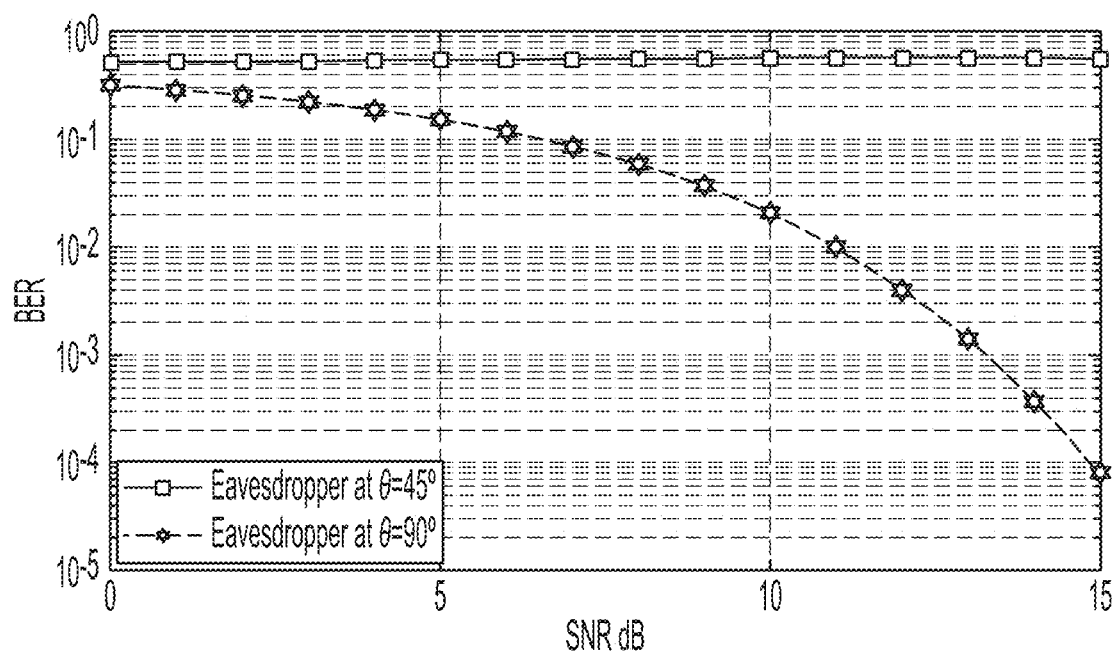
FIG. 7 illustrates bit error rate at an eavesdropper vs. signal-to-noise ratio for different eavesdropper location directions according to certain example embodiments.

FIG. 7 illustrates the BER at the eavesdropper located at different angles vs SNR value. It can be seen that as the eavesdropper gets closer to the angle of the tag, the secrecy performance degrades and the performance of the eavesdropper quickly improves with increased SNR. Thus, the communication of the backscatter cannot be secured when the eavesdropper is at the same angle of the tag with respect to the reader. The results demonstrate that the embodiments described herein are functional, and can secure a tag's signal where the BER is high at the eavesdropper's location and low at the reader's (legitimate receiver) location. This can attain the required secrecy where it is not practical for the eavesdropper to achieve alignment with the tag's direction such as in the case of RFID systems for toll payments in highways.

Figure 8:
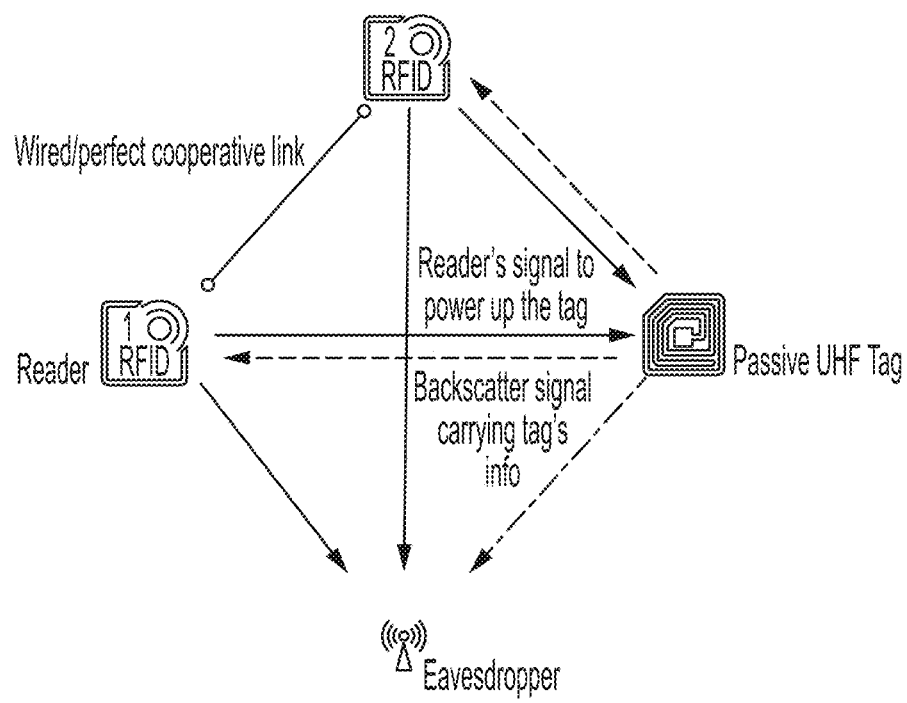
FIG. 8 illustrates an extended dual reader setup for position based security according to some example embodiments.

In various embodiments, two cooperative readers may be used in situations where it is possible for an eavesdropper to align itself with the direction of the tag with respect to the reader. As illustrated in FIG. 8, the two readers are fully cooperative and fully synchronized, thereby fully aware of their relative locations to each other and to the tag's location. The two readers are also fully aware of each others' generated reader signals, X1,X2. For example, two wired readers may be used in a master slave mode, or one reader with two physically separated arrays of antennas connected to two different radio frequency (RF) chains.

The two readers may transmit their two different randomly generated signals simultaneously, $X_1,X_2$, using the DM on each one of them which is directed to the tag's direction at angles $\Theta_{R1}$ and $\Theta_{R2}$ from the two readers, respectively. Furthermore, the activation signal arriving at the tag may be the superposition of the two signals $X_1+X_2$, which is known to both readers due to their cooperation setup. Any one of the readers may use $X_1,X_2$ to recover the tag's signal from the backscatter signal.

Due to the use of the combinations of $X_1+X_2$ as the base signal for activating the tag, the eavesdropper needs to read the leakage of both reader's signals (arrows from readers and tag to eavesdropper in FIG. 8) correctly to be able to recover the tag's signal from the backscatter. This is not possible due to the use of two intersecting directional modulation reader signals directed to the tag's location. The only possibility to receive non-scrambled leakages is when the eavesdropper is at the same location of the tag. In this way, the existence of the eavesdropper at the same physical location of the tag may be detectable to any system operator, resulting in eavesdropping being difficult.

Figure 9:
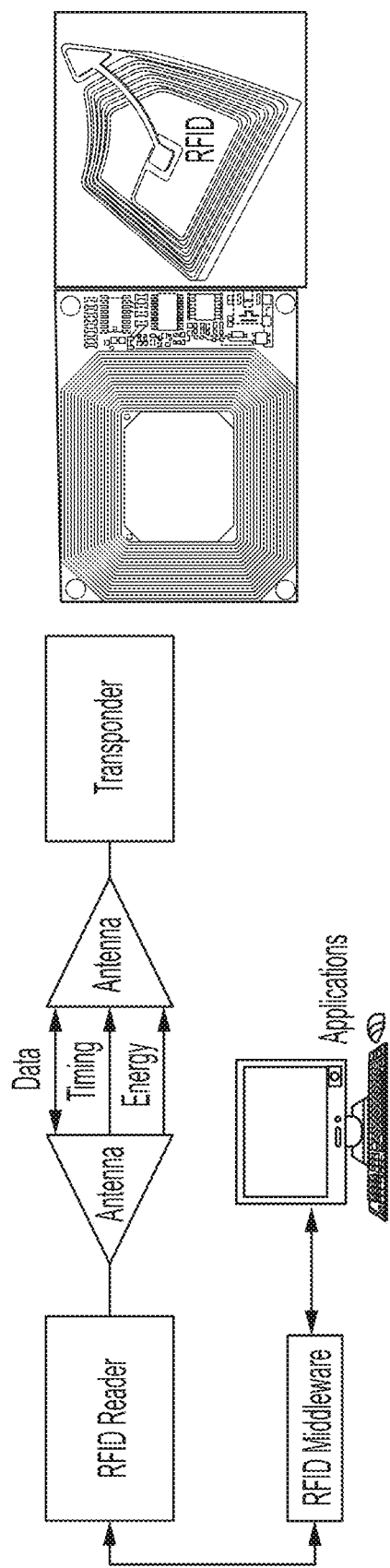
FIG. 9 illustrates a radio frequency identification system architecture according to various example embodiments.
Figure 10:
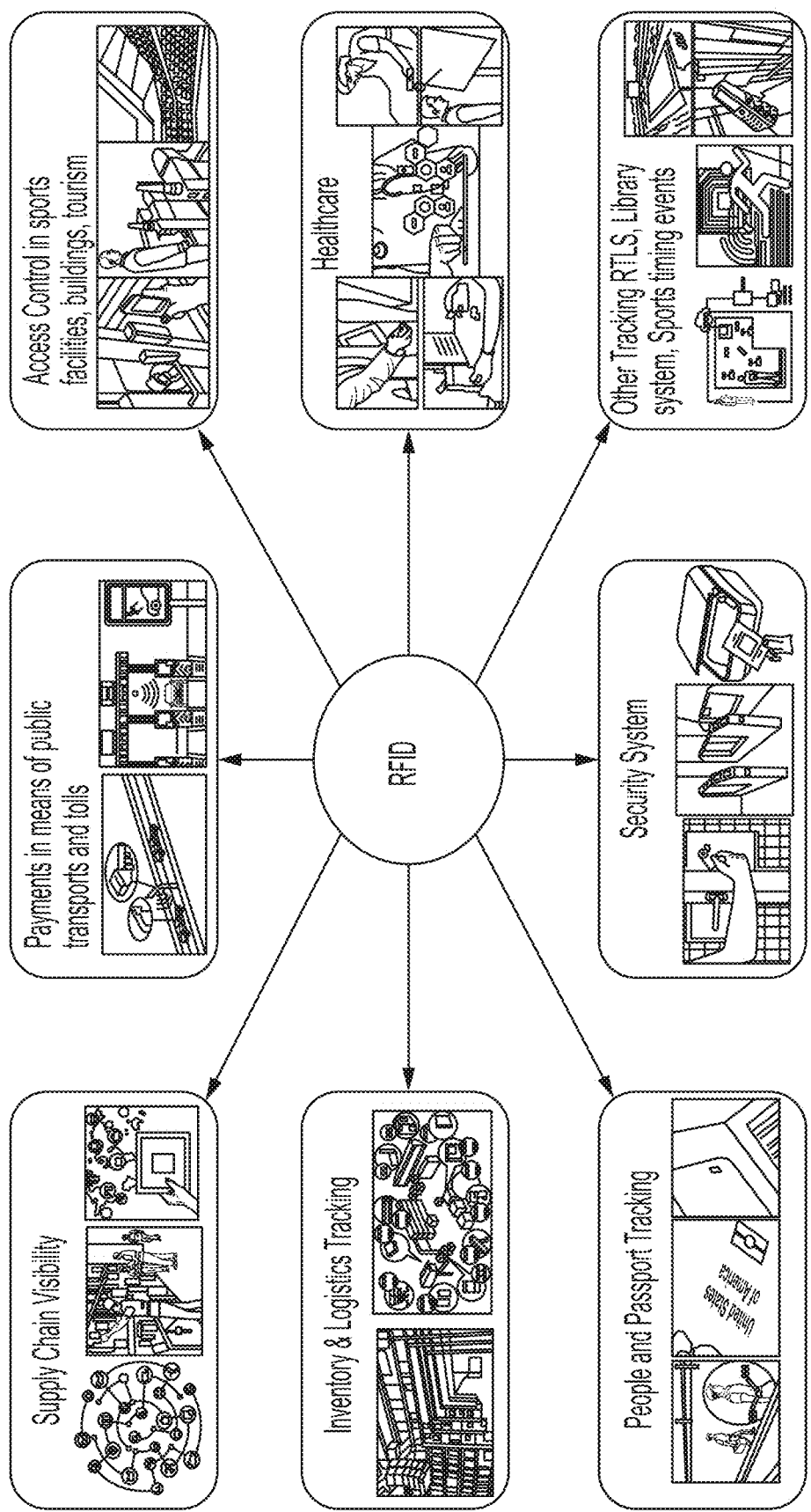
FIG. 10 illustrates potential radio frequency identification applications according to certain example embodiments.

FIG. 9 illustrates a radio frequency identification system architecture according to various example embodiments, while FIG. 10 illustrates potential radio frequency identification applications according to certain example embodiments.

Figure 11:
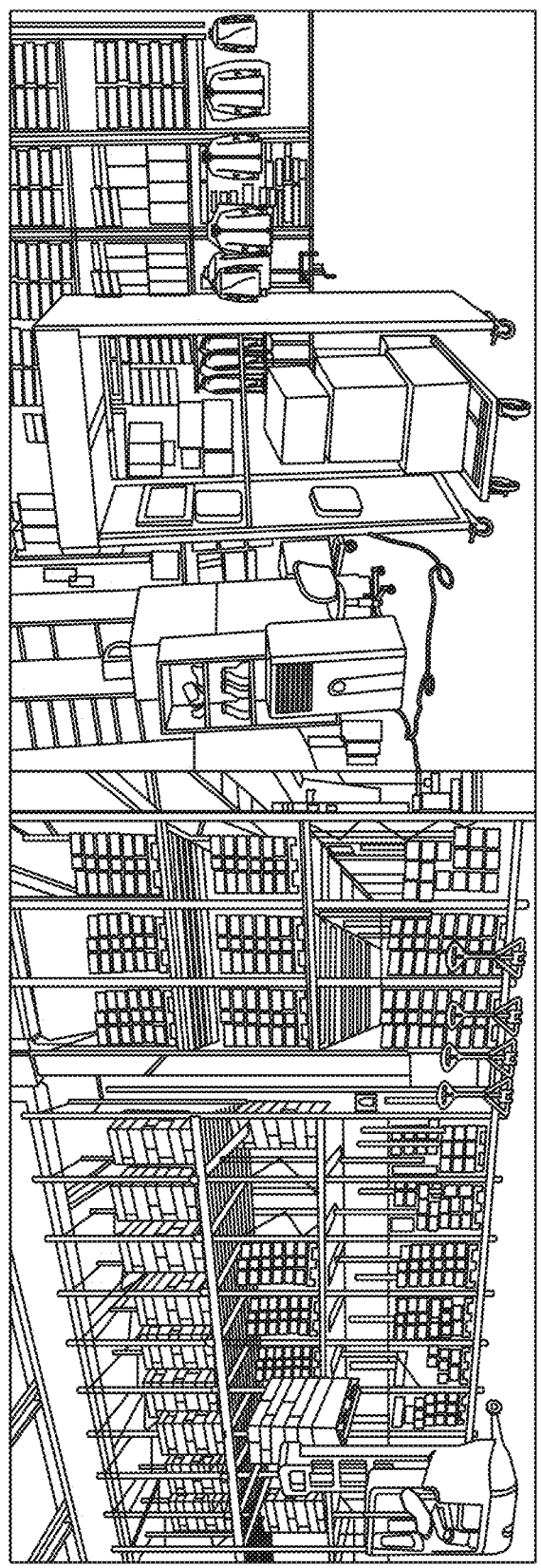
FIG. 11 illustrates radio frequency identification applications for inventory according to some example embodiments.
Figure 12:
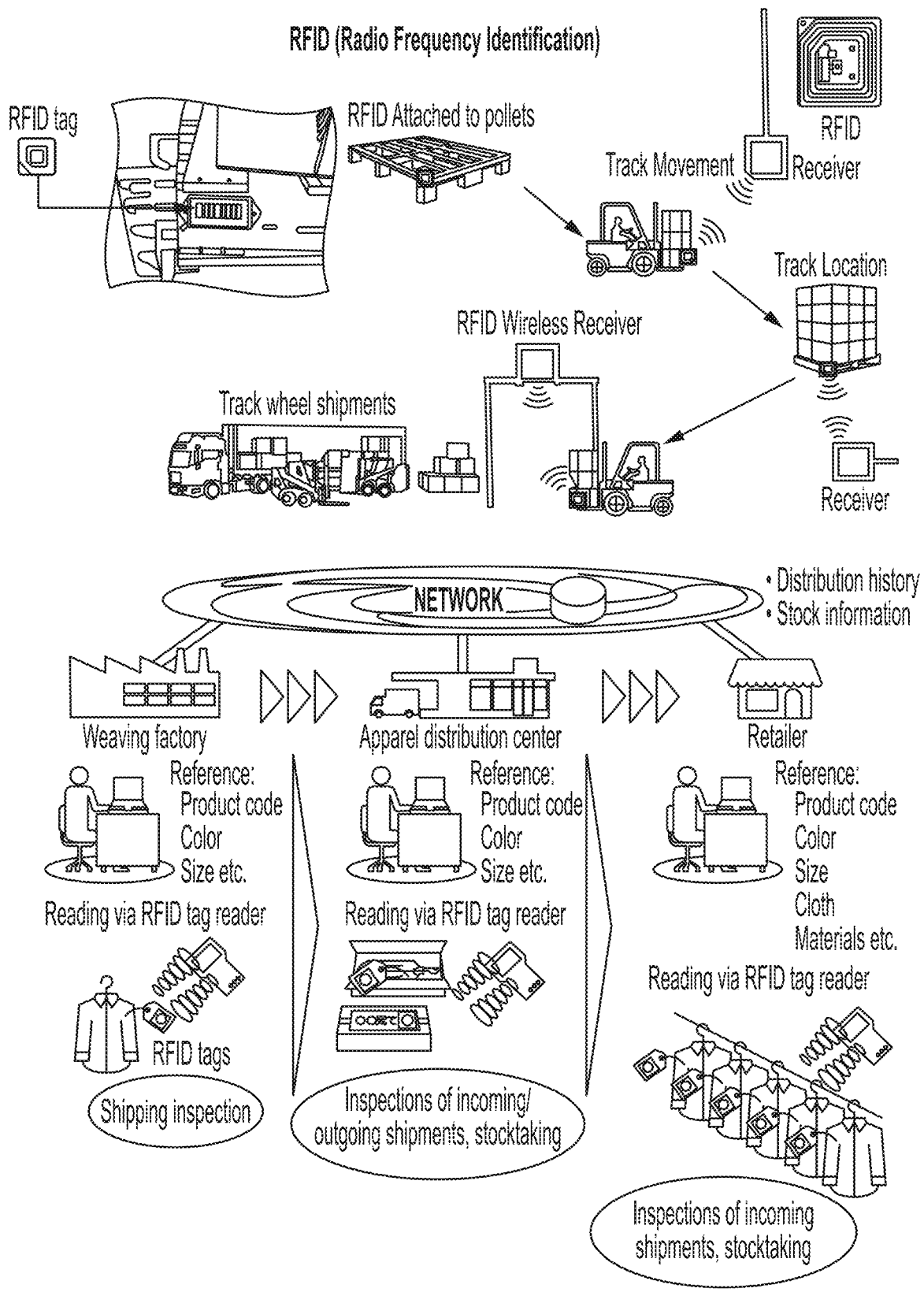
FIG. 12 illustrates radio frequency identification applications for supply chain management according to various example embodiments.
Figure 13A:
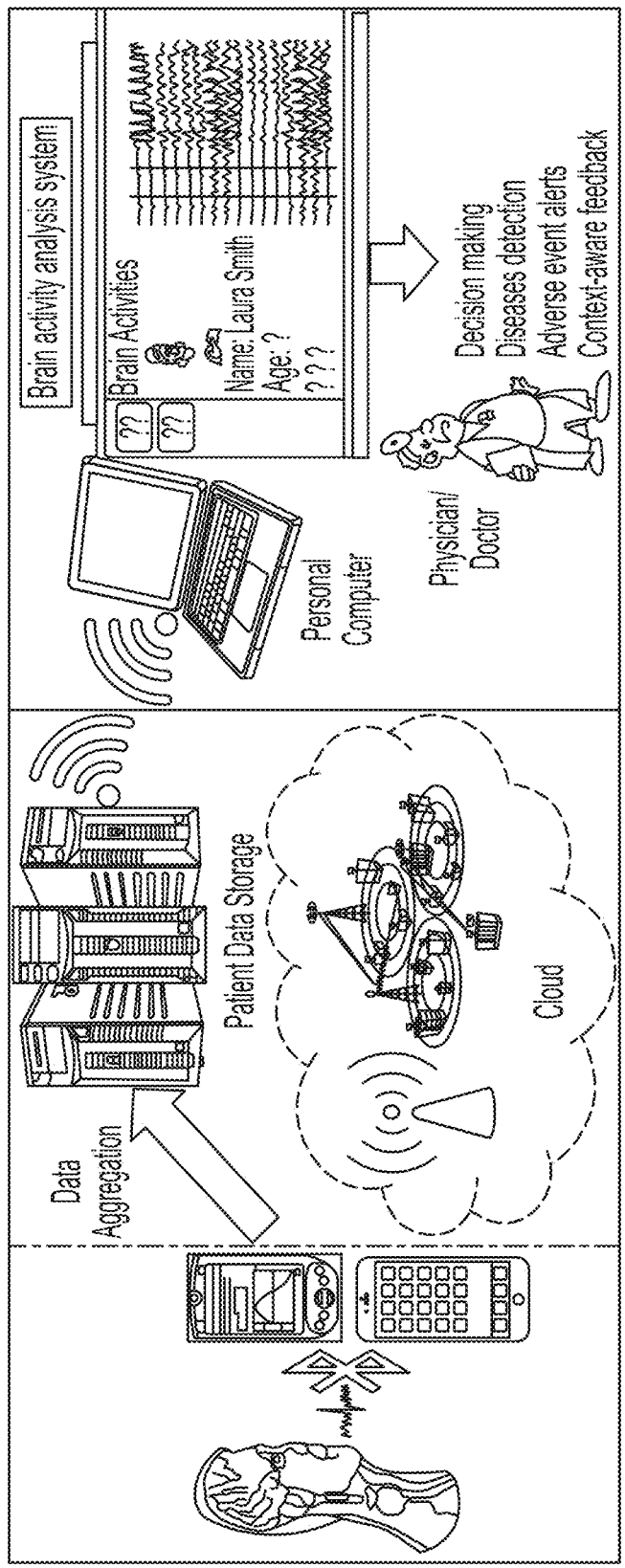
FIG. 13A illustrates healthcare radio frequency identification applications according to certain example embodiments.
Figure 13B:
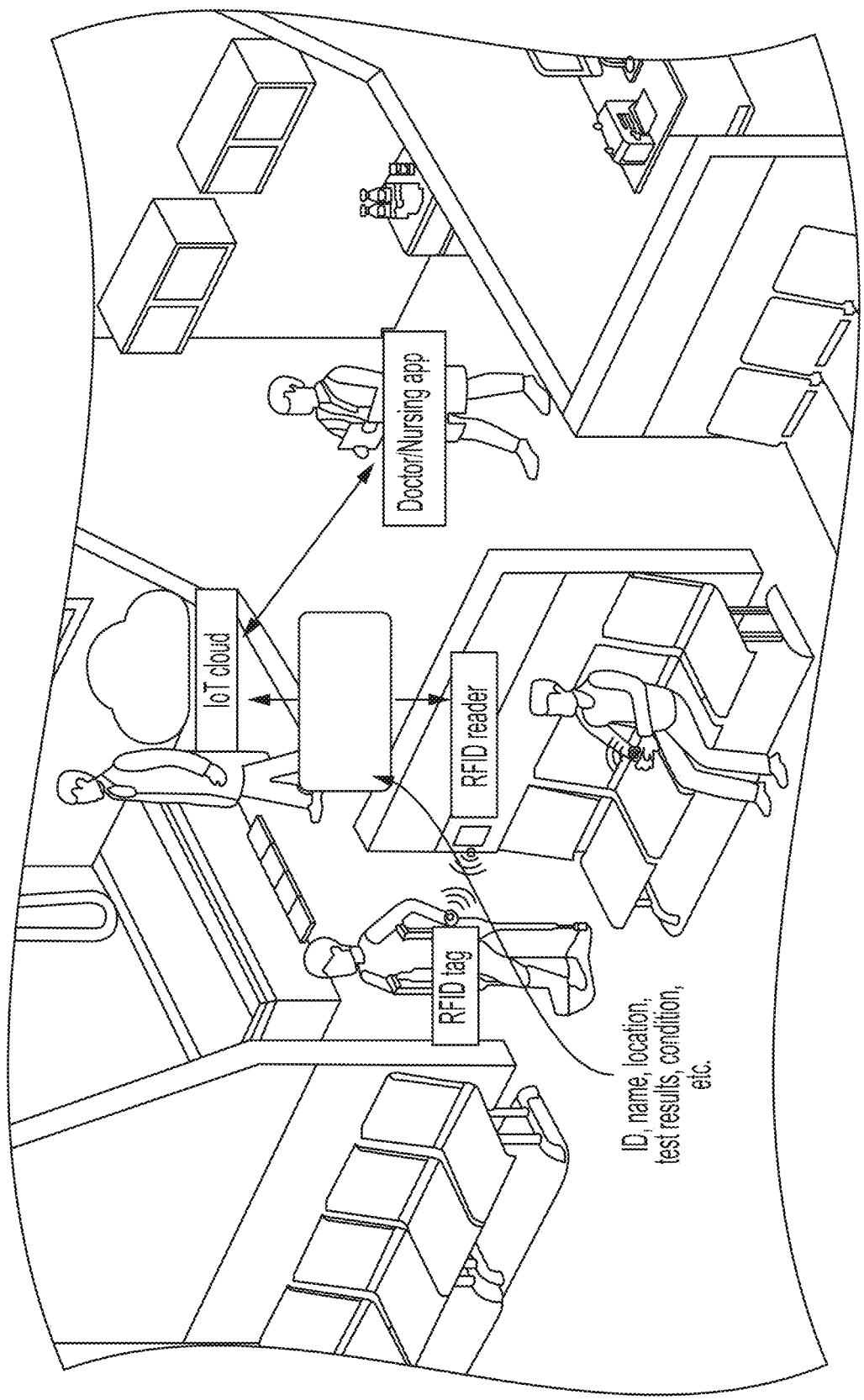
FIG. 13B illustrates additional healthcare radio frequency identification applications according to some example embodiments.
Figure 13C:
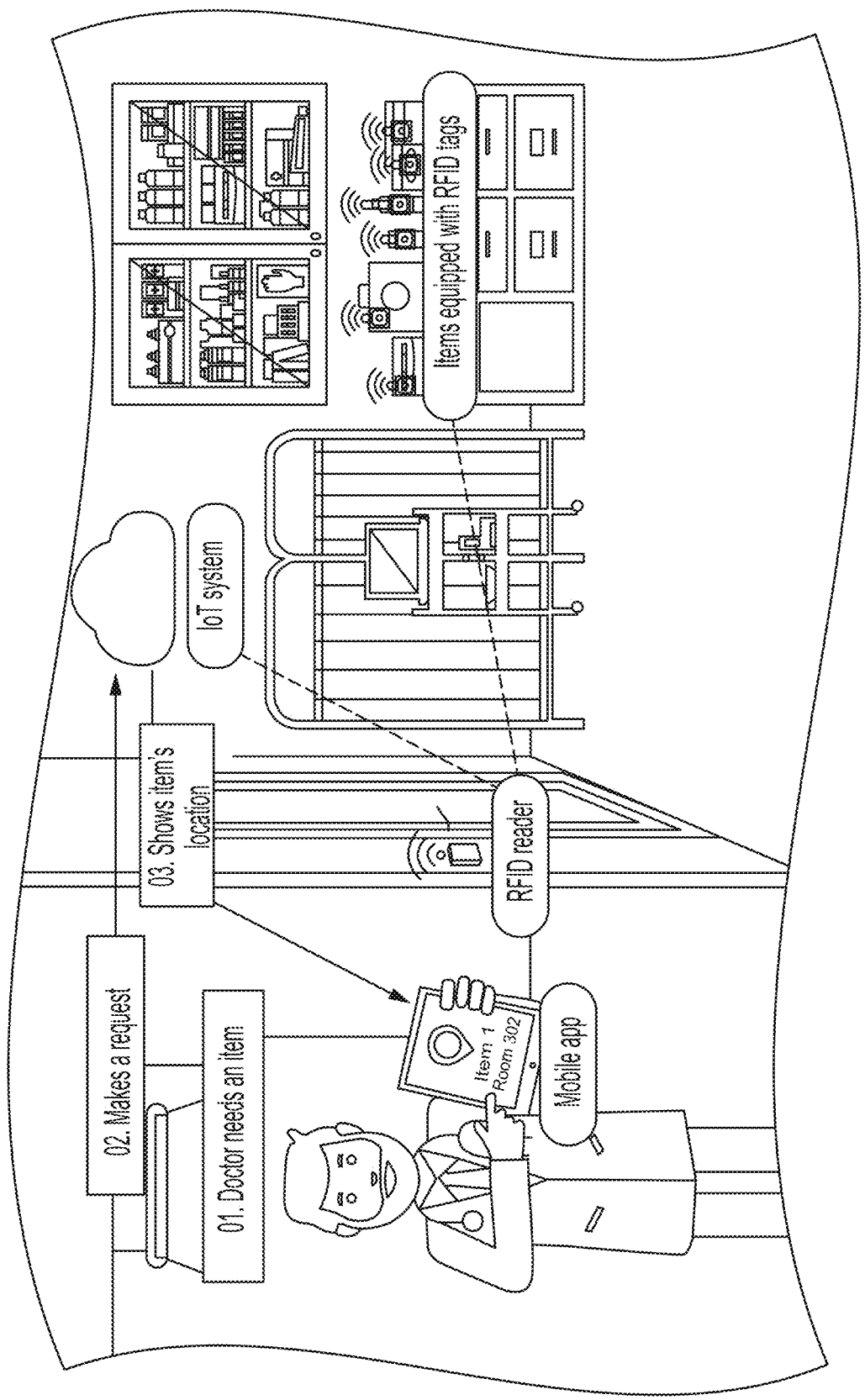
FIG. 13C illustrates additional healthcare radio frequency identification applications according to various example embodiments
Figure 14:
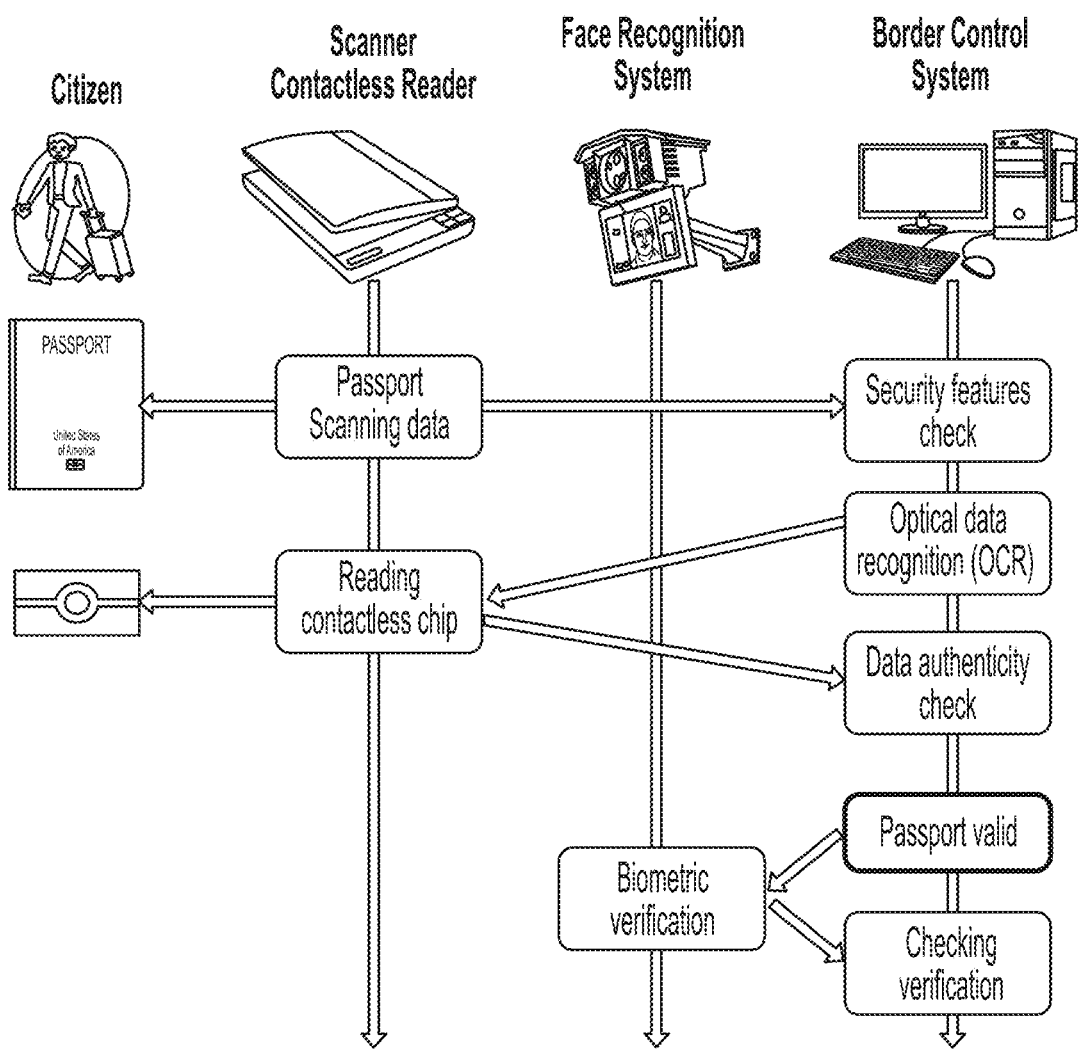
FIG. 14 illustrates radio frequency identification passport tracking-eGate according to some example embodiments.
Figure 15:
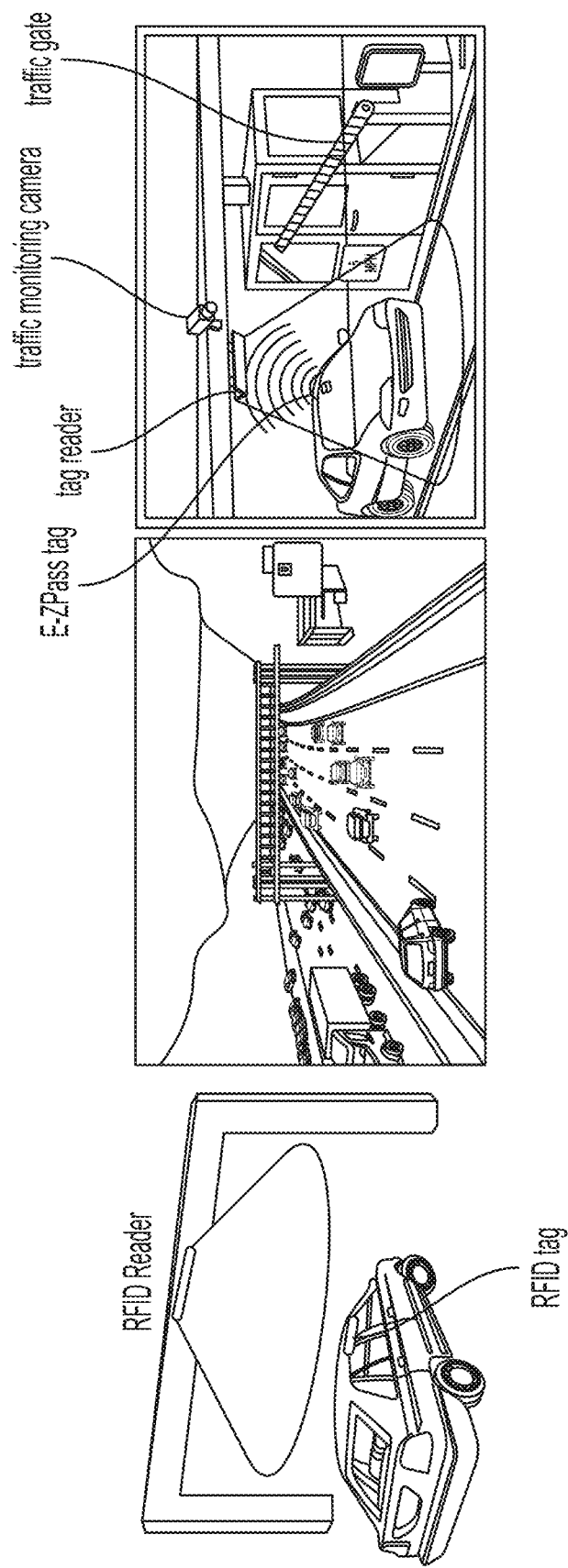
FIG. 15 illustrates a radio frequency identification-based toll system according to various example embodiments.
Figure 16:
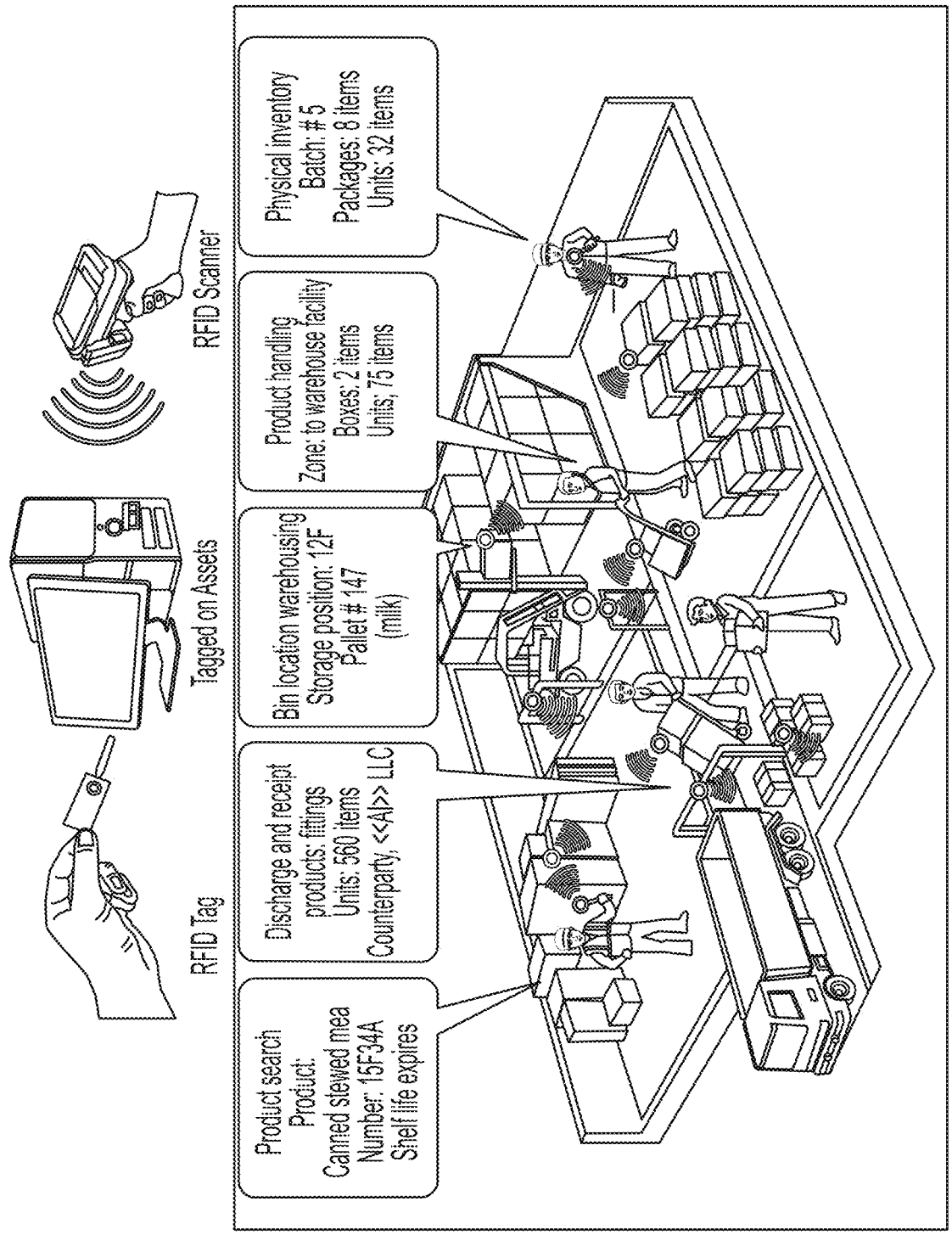
FIG. 16 illustrates asset tracking and management according to certain example embodiments.

FIG. 11 illustrates radio frequency identification applications for inventory according to some example embodiments. FIG. 12 illustrates radio frequency identification applications for supply chain management according to various example embodiments. FIGS. 13A-C illustrate healthcare radio frequency identification applications according to certain example embodiments. FIG. 14 illustrates radio frequency identification passport tracking-eGate according to some example embodiments. FIG. 15 illustrates a radio frequency identification-based toll system according to various example embodiments. FIG. 16 illustrates asset tracking and management according to certain example embodiments.

Figure 17:
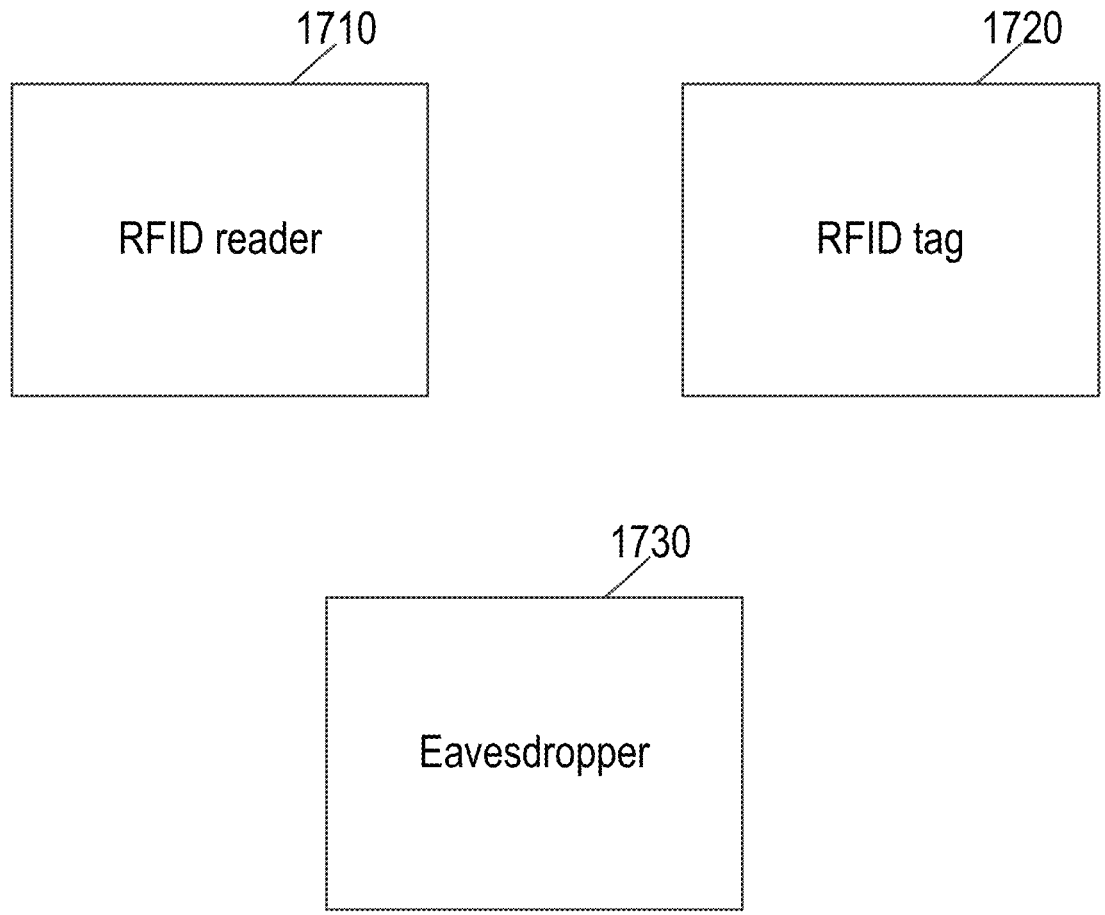
FIG. 17 illustrates an example of various network devices according to some example embodiments.

FIG. 17 illustrates an example of a system according to certain example embodiments. In one example embodiment, a system may include multiple devices, such as, for example, RFID reader 1710, RFID tag 1720, and/or eavesdropper 1730.

In some example embodiments, RFID reader 1710 may be a RF transmitter and receiver that can read and write information to RFID tag 1720.

RFID tag 1720 may include at least an integrated circuit for modulating and demodulating RF, and an antenna for transmitting and receiving signals. As an example, RFID tag 1720 may use frequency ranges from low frequencies of 125-134 kHz and 140-148.5 kHz, and high frequencies of 850-950 MHz and 2.4-2.5 GHz.

RFID reader 1710 and/or RFID tag 1720 may be part of a passive reader active tag (PRAT) system having a passive reader which only receives radio signals from active tags (battery operated, transmit only). The reception range of a PRAT system reader can be adjusted from 1-2,000 feet (0-600 m), allowing flexibility in applications such as asset protection and supervision. RFID reader 1710 and/or RFID tag 1720 may be part of an active reader passive tag (ARPT) system, where the reader is active, transmitting an interrogator radio signal, receiving authentication signal replies from passive tags. Furthermore, RFID reader 1710 and/or RFID tag 1720 may be part of an active reader active tag (ARAT) system, where the reader is active, and interacts with active or battery-assistive passive tags.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

BER Block Error Rate
CPU Central Processing Unit
DM Directional Modulation
GPS Global Positioning System
HDD Hard Disk Drive
IEEE Institute of Electrical and Electronics Engineers
IMSI International Mobile Subscriber Identity
IoT Internet of Things
PDA Personal Digital Assistance
RAM Random Access Memory
RF Radio Frequency
RFID Radio Frequency Identification
SNR Signal-to-Noise Ratio
WLAN Wireless Local Area Network

We claim:

1. A system, comprising:
a radio frequency identification reader; and
a passive radio frequency identification tag,
wherein the radio frequency identification reader is configured to implement dynamic directional modulation to transmit a readable signal in a direction of the passive radio frequency identification tag, while transmitting a scrambled signal in other directions away from the passive radio frequency identification tag.

2. The system of claim 1, wherein an antenna of the radio frequency identification reader antenna is configured to transmit an excitation signal based on a beamforming vector fed into tuneable phase shifters of the radio frequency identification reader's antennas, a signal of the radio frequency identification reader, and an artificially injected noise designed to be null to a desired channel direction channel toward the passive radio frequency identification tag.

3. The system of claim 1, wherein the radio frequency identification reader is configured to transmit a signal via a pseudorandom uniform distribution generator.

* * * * *